US012621164B2

(12) United States Patent
Karabacak et al.

(10) Patent No.: US 12,621,164 B2
(45) Date of Patent: May 5, 2026

(54) SYSTEMS AND METHODS FOR AUTHENTICATION USING ANTENNA ARRAY GEOMETRIES

(71) Applicant: UNIVERSITY OF SOUTH FLORIDA, Tampa, FL (US)

(72) Inventors: Murat Karabacak, Tampa, FL (US); Berker Pekoz, Tampa, FL (US); Gokhan Mumcu, Tampa, FL (US); Huseyin Arslan, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 250 days.

(21) Appl. No.: 18/279,957

(22) PCT Filed: Mar. 1, 2022

(86) PCT No.: PCT/US2022/018260
§ 371 (c)(1),
(2) Date: Sep. 1, 2023

(87) PCT Pub. No.: WO2022/187192
PCT Pub. Date: Sep. 9, 2022

(65) Prior Publication Data
US 2024/0163111 A1     May 16, 2024

Related U.S. Application Data

(60) Provisional application No. 63/154,992, filed on Mar. 1, 2021.

(51) Int. Cl.
H04L 29/06     (2006.01)
H04L 9/00     (2022.01)
H04L 9/32     (2006.01)

(52) U.S. Cl.
CPC ............ *H04L 9/3247* (2013.01); *H04L 9/001* (2013.01); *H04L 2209/08* (2013.01); *H04L 2209/805* (2013.01)

(58) Field of Classification Search
CPC ... H04L 9/3247; H04L 9/001; H04L 2209/08; H04L 2209/805
See application file for complete search history.

(56) References Cited

U.S. PATENT DOCUMENTS

| 3,524,192 | A | * | 8/1970 | Sakiotis | ................... | H01Q 3/24 |
| | | | | | | 343/777 |
| 8,199,048 | B1 | * | 6/2012 | Medina Sanchez | .. | G01S 7/4004 |
| | | | | | | 342/174 |

(Continued)

FOREIGN PATENT DOCUMENTS

| CN | 201052144 | Y | * | 4/2008 | | |
| CN | 104090260 | A | * | 10/2014 | ............... | G01S 3/74 |

(Continued)

OTHER PUBLICATIONS

A. S. Oluwole and V. M. Srivastava, "Modeling of RF security system using smart antennas," 2015 International Conference on Cyberspace (Cyber-Abuja), Abuja, Nigeria, 2015, pp. 118-122, (Year: 2015).*

(Continued)

*Primary Examiner* — Sher A Khan
(74) *Attorney, Agent, or Firm* — Meunier Carlin & Curfman LLC

(57)     ABSTRACT

In one embodiment, an authentication scheme (500) that combines chaotic antenna array geometries with pseudorandom pilot sequences and antenna array activation sequences is provided. A receiving device (110A) receives a pilot signal (130) from a transmitting device (110B) (501). The receiving device computes a unique signature (125) for the transmitting device that captures differences between the (Continued)

Receive a pilot sequence — 501

Determine signature from pilot sequence — 503

Determined signature within threshold of any stored signature? — 505

No → Transmitter not authenticated — 509

Yes

Transmitter authenticated — 507

500 received signal and expected pilot signal (503). The differences may be due to a unique antenna array geometry of the transmitting device, a pseudorandom pilot sequence used by the transmitting device, and an antenna array activation sequence used by the transmitting device. Later, this computed unique signature may be used by other receiving devices to authenticate the transmitting device (505; 507).

18 Claims, 7 Drawing Sheets

(56) References Cited

U.S. PATENT DOCUMENTS

| | | | | |
|---|---|---|---|---|
| 10,122,736 | B2 * | 11/2018 | Baxley | H04W 12/128 |
| 10,153,853 | B1 * | 12/2018 | Karabacak | H04B 17/391 |
| 10,366,378 | B1 * | 7/2019 | Han | G06Q 20/204 |
| 2005/0007278 | A1 * | 1/2005 | Anson | G01S 3/48 |
| | | | | 342/451 |
| 2014/0126306 | A1 | 5/2014 | Otterstedt | |
| 2015/0229479 | A1 * | 8/2015 | Cho | H04L 9/0861 |
| | | | | 713/156 |
| 2016/0042169 | A1 * | 2/2016 | Polehn | H04B 7/0613 |
| | | | | 726/20 |
| 2017/0021947 | A1 * | 1/2017 | Pellegrino | B64G 1/4282 |
| 2017/0055128 | A1 | 2/2017 | Smith | |
| 2018/0103374 | A1 * | 4/2018 | Huang | H04L 63/0876 |
| 2018/0145824 | A1 * | 5/2018 | Carroll | H04L 9/12 |
| 2019/0334730 | A1 | 10/2019 | Endress | |
| 2019/0348767 | A1 | 11/2019 | Amyotte | |
| 2020/0044844 | A1 * | 2/2020 | Sridhara | H04W 12/03 |
| 2020/0052912 | A1 | 2/2020 | Lu | |
| 2020/0067186 | A1 * | 2/2020 | Reynolds | H01Q 3/32 |
| 2020/0342129 | A1 * | 10/2020 | Chaiken | G06F 21/602 |
| 2021/0258138 | A1 | 8/2021 | Mandecki | |
| 2022/0234378 | A1 | 7/2022 | Jackson | |
| 2022/0271953 | A1 | 8/2022 | Zeh | |

FOREIGN PATENT DOCUMENTS

| | | | | | |
|---|---|---|---|---|---|
| CN | 108028669 | A | * | 5/2018 | H04L 27/00 |
| DE | 69830738 | T2 | * | 5/2006 | H04W 16/28 |
| DE | 102021119891 | A1 | * | 2/2023 | H04W 12/106 |
| JP | 2004064741 | A | * | 2/2004 | |
| WO | WO-2019154447 | A1 | * | 8/2019 | H04W 12/02 |
| WO | WO-2020049452 | A1 | * | 3/2020 | H04L 63/0807 |

OTHER PUBLICATIONS

International search report and written opinion in PCT/US2022/018260. Mailed Aug. 24, 2022. 14 pages.
Final Rejection dated Jun. 10, 2024 in U.S. Appl. No. 17/683,637.
Non-Final Rejection dated Feb. 26, 2024 in U.S. Appl. No. 17/683,637.
Church, "Multimaterial and Multilayer Direct Digital Manufacturing of 3-D Structural Microwave Electronics", 2017, Proceedings of the IEEE, pp. 688-701. (Year: 2017).
Non-Final Rejection dated Sep. 16, 2024 in U.S. Appl. No. 17/683,637.
S. Balakrishnan, S. Gupta, A. Bhuyan, P. Wang, D. Koutsonikolas and Z. Sun, "Physical Layer Identification Based on Spatial-Temporal Beam Features for Millimeter-Wave Wireless Networks," in IEEE Transactions on Information Forensics and Security, vol. 15, pp. 1831-1845, 2020, doi: 10.1109/TIFS.2019.2948283.
P. W. Shor, "Algorithms for quantum computation: discrete logarithms and factoring," in Proceedings 35th Annual Symposium on Foundations of Computer Science, 1994, pp. 124-134.

C. H. Bennett and P. W. Shor, "Privacy in a quantum world," Science, vol. 284, No. 5415, pp. 747-748, 1999.
W. Trappe, "The challenges facing physical layer security," IEEE Commun. Mag., vol. 53, No. 6, pp. 16-20, 2015.
J. Qadir, A. Al-Fuqaha, and M. Shafique, "Adversarial ML for vehicular networks: Strategies for attack and defense," in Proceedings of the IEEE Vehicular Technology Conference—Spring, Apr. 2019, pp. 1-150.
A. Ranganathan, H. Ólafsdóttir, and S. Capkun, "SPREE: A spoofing resistant GPS receiver," in Proceedings of the 22nd Annual International Conference on Mobile Computing and Networking, ser. MobiCom '16. New York, NY, USA: Association for Computing Machinery, 2016, p. 348-360.
S. Sharma, R. Mishra, and K. Singh, "A survey on cross layer security," IJCA Proc. on National Conf. on Innov. Paradigms Eng. Technol. (NCIPET 2012), No. 5, pp. 10-14, Mar. 2012.
K. Sharma and M. Ghose, "Cross layer security framework for wireless sensor networks," Int. J. Secur. Its Appl., vol. 5, pp. 39-52, Jan. 2011.
X. Wang, P. Hao, and L. Hanzo, "Physical-layer authentication for wireless security enhancement: current challenges and future developments," IEEE Commun. Mag., vol. 54, No. 6, pp. 152-158, 2016.
V. Brik, S. Banerjee, M. Gruteser, and S. Oh, "Wireless device identification with radiometric signatures," in Proceedings of the 14th ACM International Conference on Mobile Computing and Networking, ser. MobiCom '08. New York, NY, USA: Association for Computing Machinery, 2008, p. 116-127.
Q. Xu, R. Zheng, W. Saad, and Z. Han, "Device fingerprinting in wireless networks: Challenges and opportunities," IEEE Commun. Surv. Tutorials, vol. 18, No. 1, pp. 94-104, 2016.
X. Duan and X. Wang, "Authentication handover and privacy protection in 5G HetNets using software-defined networking," IEEE Commun. Mag., vol. 53, No. 4, pp. 28-35, 2015.
R. B. Ertel, P. Cardieri, K. W. Sowerby, T. S. Rappaport, and J. H. Reed, "Overview of spatial channel models for antenna array communication systems," IEEE Pers. Commun., vol. 5, No. 1, pp. 10-22, Feb. 1998.
H. Lebret and S. Boyd, "Antenna array pattern synthesis via convex optimization," IEEE Trans. on Signal Process., vol. 45, No. 3, pp. 526-532, Mar. 1997.
L. Xiao, L. J. Greenstein, N. B. Mandayam, and W. Trappe, "Using the physical layer for wireless authentication in time-variant channels," IEEE Trans. on Wirel. Commun., vol. 7, No. 7, pp. 2571-2579, 2008.
M. Hafez, M. Yusuf, T. Khattab, T. Elfouly, and H. Arslan, "Secure spatial multiple access using directional modulation," IEEE Trans. on Wirel. Commun., vol. 17, No. 1, pp. 563-573, 2018.
B. Peköz, M. Hafez, S. Köse, and H. Arslan, "Reducing precoder/channel mismatch and enhancing secrecy in practical MIMO systems using artificial signals," IEEE Commun. Lett., vol. 24, No. 6, pp. 1347-1350, 2020.
D. Kapetanovic, G. Zheng, and F. Rusek, "Physical layer security for massive MIMO: An overview on passive eavesdropping and active attacks," IEEE Commun. Mag., vol. 53, No. 6, pp. 21-27, Jun. 2015.
Y. A. Eldemerdash, O. A. Dobre, and M. Öner, "Signal identification for multiple-antenna wireless systems: Achievements and challenges," IEEE Commun. Surv. Tutorials, vol. 18, No. 3, pp. 1524-1551, 2016.
L. Zhang, M. Sun, Z. Ou, C. Ouyang, and H. Yang, "A secure receive spatial modulation scheme based on random precoding," IEEE Access, vol. 7, pp. 122 367-122 377, 2019.
D. Tse and P. Viswanath, "MIMO I: spatial multiplexing and channel modeling," in Fundamentals of Wireless Communication. Cambridge University Press, 2005, p. 290-331.
International Preliminary Report on Patentability dated Sep. 14, 2023.

* cited by examiner

120B

Feed Line 160

Transmitting Device
110B

Pilot Sequence
130

Activation
Sequence 140

120A

Receiving Device
110A

Storage 130

Signature 125

100

300

400

Receive a pilot sequence — 601

Determine signature from pilot sequence — 603

Add signature to list of known signatures — 605

Distribute signature list to receivers — 607

600

706

System Memory 704

Volatile

Non-Volatile

Processing Unit 702

Removable Storage 708

Non-Removable Storage 710

Output Device(s) 716

Input Device(s) 714

Communication Connection(s) 712

700

SYSTEMS AND METHODS FOR AUTHENTICATION USING ANTENNA ARRAY GEOMETRIES

CROSS REFERENCE TO RELATED APPLICATIONS

This application is a United States National Phase Patent Application of International Patent Application Number PCT/US2022/018260, filed on Mar. 1, 2022, which claims priority to U.S. Provisional Patent Application No. 63/154,992 filed on Mar. 1, 2021 and entitled "SYSTEMS AND METHODS FOR AUTHENTICATION USING ANTENNA ARRAY GEOMETRIES." The disclosures of which are hereby incorporated by reference in their entireties.

BACKGROUND

The emergence of quantum computing has recently shown that currently used conventional encryption techniques may be cracked with ease in the near future. This pushed researchers to finding new horizons that satisfy security requirements through the use of non-cryptographic approaches, such as utilizing the physical layer (PHY) properties of the system or machine learning (ML) techniques to infer presence of adversaries and defend accordingly. Quantum password cracking aside, PHY authentication becomes critical in authenticating simplex broadcasts in which cryptographic approaches cannot be utilized, such as spoofed global positioning system (GPS) signals. Layered security approaches have been shown to be redundant and inflexible for future network structures.

Authenticating user equipments (UEs) using their PHY characteristics in developing a PHY security (PLS) approach has been gaining traction. The idea of extracting artifacts caused by imperfections in the source network interface card (NIC) to authenticate devices has been around for more than a decade. Channel similarities in addition to the RF fingerprint of the device may be also utilized in the control-layer based authenticator that aims to replace high-latency connections to remotely located authentication servers with local verification among fifth generation (5G) heterogeneous network (HetNet) access points (APs).

Antenna array geometry optimization literature has historically focused on designing "smart" or adaptive antenna arrays with improved far or near-field spatiospectral localization. Although PLS using multiple antennas was also introduced more than a decade ago when signals received from multiple-input multiple-output (MIMO) transmitters are authenticated using the spatiospectrotemporal correlation of the wireless channel. However, due to the randomness of the channel this method can provide limited control on spatiospectrotemporal signatures. Despite the further studies of PHY security of MIMO systems, the literature for PHY authentication for this systems remains underdeveloped to date.

SUMMARY

In one embodiment, a novel authentication scheme that combines chaotic antenna array geometries with pseudorandom pilot sequences and antenna array activation sequences is provided. By combining chaotic antenna array geometries, pseudorandom pilot sequences, and antenna array activation sequences unclonable authentication devices are achieved, even when an adversary eavesdrops the message exchange or figures out the unique antenna array geometry by x-ray radiography. As will be described further below, the proposed scheme is both accurate and scalable. For example, the proposed authentication scheme may provide a 1% false authentication rate at 10 dB SNR, while achieving a missed authentication rate of less than 1%.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a document attachment system and method. Together with the description, the figures further serve to explain the principles of the document attachment system and method described herein and thereby enable a person skilled in the pertinent art to make and use the document attachment system and method.

DETAILED DESCRIPTION

1. Notation

Throughout this application, vectors are represented using lowercase bold-face letters, matrices are uppercase boldface letters, and non-bold letters are used for scalars. The superscripts $(\cdot)^H$, $(\cdot)^{-1}$ stand for the conjugate-transpose, and inverse operations, respectively. $\mathbb{C}$ represents the complex numbers domain, $\sim_{\mathcal{CN}}(\mu, \sigma^2)$ corresponds to complex Gaussian distributed random variable with mean $\mu$ and variance $\sigma^2$, and U(a, b) corresponds to the uniformly distributed random variable between a and b. $\|\cdot\|$ corresponds to the Euclidean norm, A⊙B and A⊘B correspond to the Hadamard multiplication of matrices A and B and division of matrix A to B, respectively. The receiving device and the transmitting device are described herein with subscripts's and $\cdot_n$ used to describe their respective attributes.

II. System Model

Figure 1:
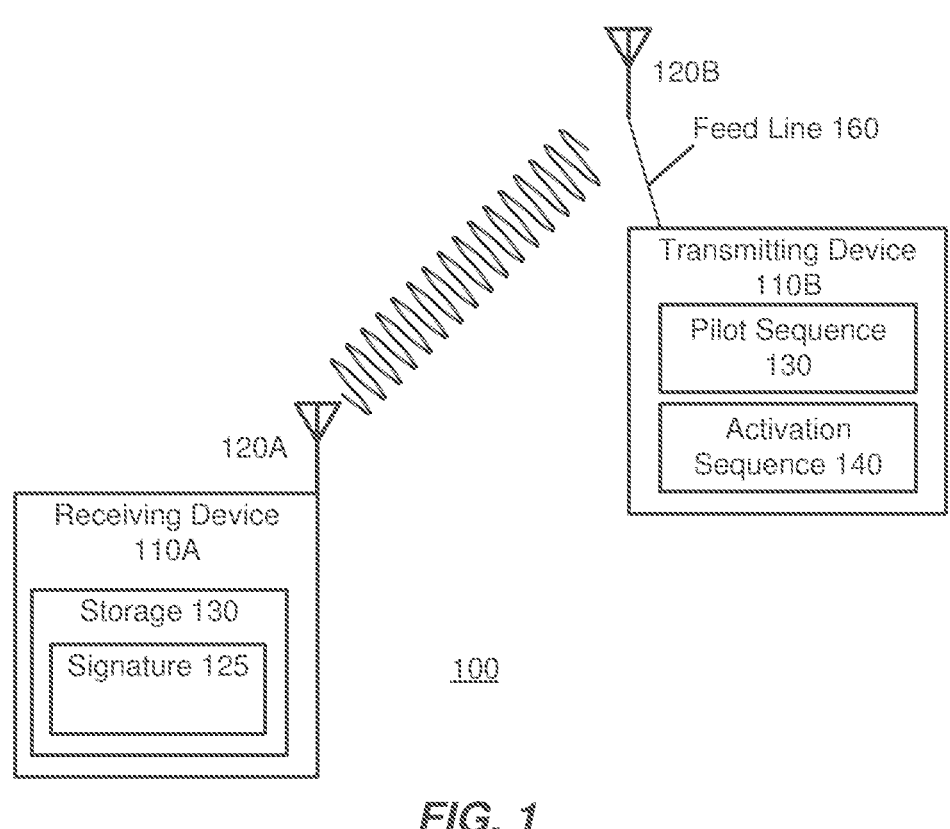
FIG. 1 is an illustration of environment for authenticating devices.

FIG. 1 is an illustration of an example environment 100 for performing device authentication. As shown, the environment 100 include a receiving device 110A and a transmitting device 110B. Each device 110 may include an antenna array 120 (i.e., the antenna arrays 120A and 120B). Each device 110 may be implemented in part using general purpose computing device such as the computing device 700 illustrated with respect to FIG. 7.

The working principle of the the receiving device 110A is (also referred to herein as authenticating device 110A) is similar to that of an active radio frequency (RF) identification (RFID) tag. However, instead of the device-specific variation of binary load state or load impedance as a function of time, it is assumed that upon the first encounter of the receiving device 110A with the transmitting device 110B, which takes place in a controlled environment, the receiving device 110A generates and saves some or all of the following identifying information, about the transmitting device 110B in a list or other data structure in a storage 130.

In some embodiments, the identifying information may include some or all of the following: 1). A chaotic antenna array geometry of the antenna array 120B; 2). An antenna activation sequence 140 equipped by the transmitting device 110B; and 3) A pilot sequence 130 (also referred to herein as pilot signal 130) transmitted by the transmitting device 110B. An example antenna array geometry is illustrated in FIG. 2.

As may be appreciated, the antenna array 120B may include a plurality of elements. Slight variations in the shape, size, and spacing of the elements of the antenna array may result in variations in a pilot sequence 130 transmitted by the transmitting device 110B to the receiving device 110A. These difference may be used by the receiving device 110A as a fingerprint to authenticate a particular transmitting device 110B.

Figure 2:
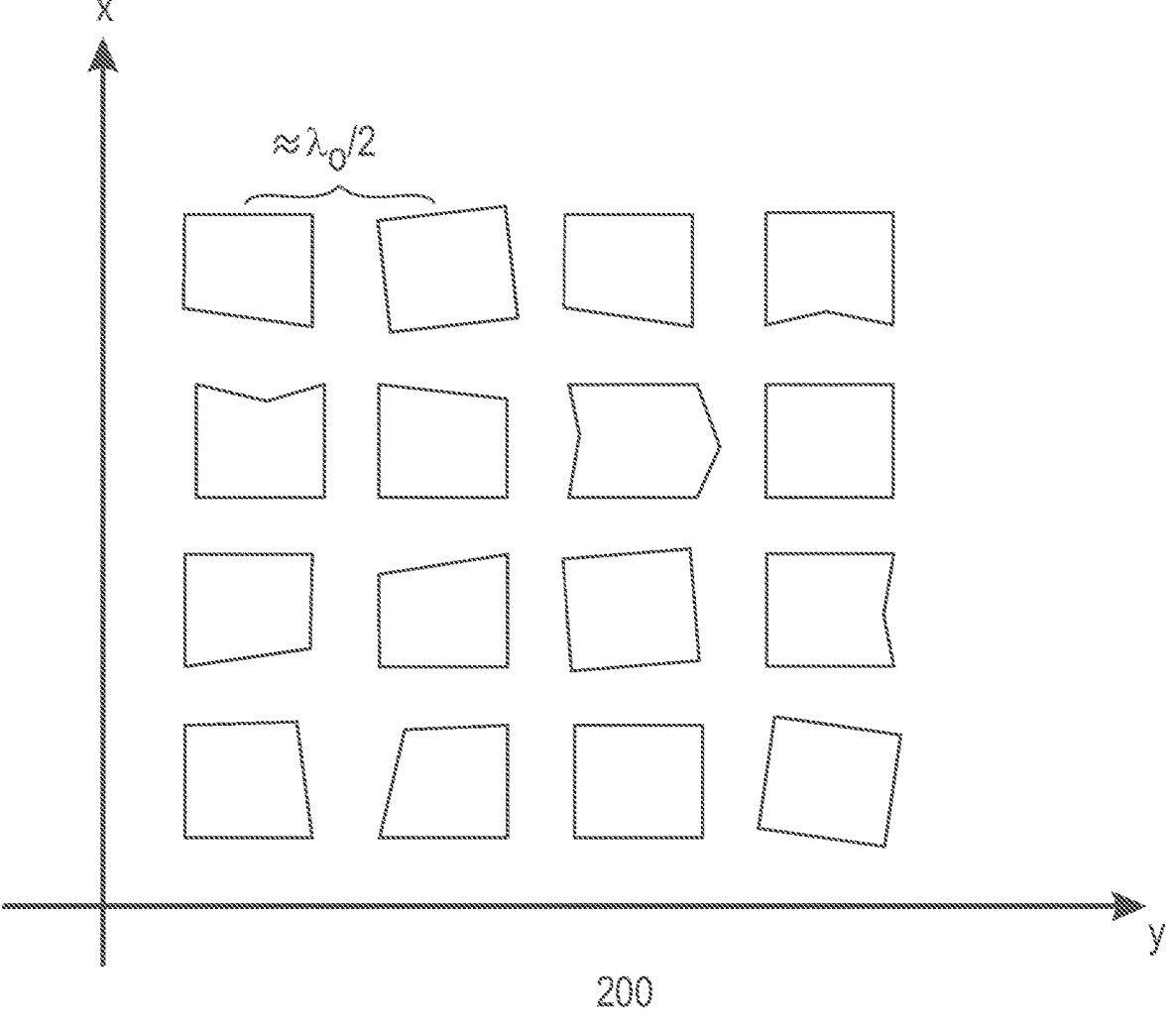
FIG. 2 is an illustration of a chaotic antenna array geometry for a 4×4 antenna array.

For example, FIG. 2 is an illustration of a chaotic antenna array geometry for a 4×4 antenna array 200. As shown, there are a plurality of elements. Each element may have a slightly different shape and the spacing between each element varies in the array 200.

In some embodiments, the variations in the elements of the antenna array 120B may be naturally occurring as part of the manufacturing process. In other embodiments, each antenna array may be modified by intentionally introducing spacing and shape variation and defects into the antenna array 120.

In some embodiments, in addition to the geometry of the antenna array 120B, variations in the wiring used by the transmitting device 110B and the activation sequence 140 may affect the pilot sequence 130 transmitted by the transmitting device 110B to the receiving device 110A. For example, the length of a feed line 160 connecting the transmitting device 110B may affect the the pilot sequence 130.

In some embodiments, during an initial registration phase, the receiving device 110A may receive the pilot sequence 130 from a transmitting device 110B. The receiving device 110A may receive the pilot sequence 130 and may use the pilot sequence 130 to generate a signature 125 for the transmitting device 110B. The signature 125 may be a difference between an expected or reference pilot sequence and the received pilot sequence 130. The difference between the signals 130 may be attributable to the defects of the antenna array 120B, the feed line 160, and the activation sequence 140. The receiving device 110A may then store the signature 125 in the storage 130. The generated signature 125 may be distributed to other receiving devices 110A.

Later, when the same or different receiving device 110A receives a pilot sequence 130 from the transmitting device 110B, the receiving device 110A may compute the signature 125 as described above and may compare the computed signature 125 to a stored signature 125. If a matching signature 125 is found, then the receiving device 110A may assume that the the transmitting device 110B is a known or trusted device and may begin communicating with the transmitting device 110B. In addition, privileges may be granted to a user or vehicle associated with the transmitting device 110B such as access to a restricted location.

If no matching signature 125 is found, then the receiving device 110A may assume that the the transmitting device 110B is not a trusted device and may stop communicating with the transmitting device 110B or may take one or more cyber-physical actions with respect to the transmitting device 110B. The cyber-physical actions may include jamming the transmitting device 110B or attempting to physically destroy the transmitting device 110B and any user or vehicle associated with the device.

This section and subsequent sections investigate ensuing encounters, during which receiving device 110A authenticates the transmitting device's 110B identity by simultaneously verifying some or all the above mentioned attributes of the transmitting device 110B in real-time in uncontrolled environments. The analysis further assumes that, as is the case with RFID tags, receiving device 110A and transmitting device 110B are synchronized; and the wireless propagation channel between each antenna of the receiving device 110A and the transmitting device 110B is representable in the form of a single tap over the utilized bandwidth without loss of generality, is time-invariant throughout the transmission interval, and is known by receiving device 110A through readily available techniques.

In some embodiments, the transmitting device 110B is equipped with $M_n = H_n \times V_n \in \mathbb{N}$ antennas where $H_n \in \mathbb{N}$ and $V_n \in \mathbb{N}$ correspond to the number of antennas on the horizontal and vertical edges of the transmitting device's 110B 2D antenna array 120B. Transmitting device's 110B 2D antenna array 120B starts off as a standard $\lambda_0/2$ spaced uniform linear antenna array ("ULAA"), where $\lambda_0$ is the free space wavelength at the center carrier frequency. Each antenna element may start off as a square patch of edge length $\lambda_g/2$ where $\lambda_g < \lambda_0$ is the guided wavelength at the center carrier frequency, and each vertex of each antenna element is translated from its original location as $p_{m,\alpha} = \bar{p}_{m,\alpha} + u_{x,m,\alpha} \hat{i} + u_{y,m,\alpha} \hat{j}$, where $p_{m,\alpha}$ is the final coordinate of the $\alpha \in \mathbb{Z}_{\leq 4}^+$ th vertex of the $m \in \mathbb{Z}_{\leq m_n}^+$ th antenna element, $\bar{p}_{m,\alpha}$ is the original coordinate thereof, $u_{x,m,\alpha}$ and $u_{y,m,\alpha}$ are both $$\sim U\left(-\lambda_g/4, \frac{\lambda_0 - \lambda_g}{4}\right)$$

and denote the horizontal and vertical displacement of the aforementioned vertex from its original location, respectively, and $\hat{i}$ and $\hat{j}$ are the horizontal and vertical unit length vectors, respectively.

Furthermore, the joint probability density function (PDF) for any two displacements satisfies:

$$f_U\left(u_{\beta_0}, m_0, \alpha_0, u_{\beta_1}, m_1, \alpha_1\right) =$$

$$f_U\left(u_{\beta_0}, m, \alpha_0\right) f_U\left(u_{\beta_1}, m, \alpha_1\right) \forall \beta_{0,1} \in \{x, y\}; m_{0,1} \in$$

$\mathbb{Z}_{\leq M_n}^+$; $\alpha_{0,1} \in \mathbb{Z}_{\leq 4}^+$. Note that by independently displacing all vertices in two dimensions, each antenna element is translated, rotated, scaled, or skewed chaotically from the Uniform Linear Array Antenna ("ULAA") design as illustrated in FIG. 2. As a result, it is assumed complex noise is introduced to the transmitting device's 110B spatial signature 125 in the transmit direction of Q as the following formula 1:

$$h_n(\Omega) = \frac{h(\Omega) + \sigma_h \tilde{h} \odot e_t(\Omega)}{\sqrt{2}} \qquad (1)$$

In the above formula 1, $h(\Omega) \in \mathbb{C}^{M_n \times 1}$ is the spatial signature 125 of the transmitting device's 110B nonmodified ULAA in the transmit direction of $\Omega$, $\sigma_h \in \mathbb{R}^+$ is the standard deviation thereof and corresponds to the positive square root of the channel gain, $e_t(\Omega) \in \mathbb{C}^{M_n \times 1}$ is the transmitting device's 110B nonmodified ULAAs unit spatial signature 125 in the transmit direction of $\Omega$, and $\tilde{h} \in \mathbb{C}^{M_n \times 1}$ is the introduced chaotic noise of which each element is $\sim \mathcal{CN}$ (0, 1) independent from others. Accordingly, the transmitting device's 110B final ULAA unit spatial signature 125 in the transmit direction of $\Omega$ may be described using the following formula 2:

$$e_n(\Omega) = \frac{\sqrt{2}\, h_n(\Omega) - h(\Omega)}{\sigma_h} \oslash \tilde{h} \qquad (2)$$

In some embodiments, each antenna is connected to an independent RF chain that is capable of carrying a complex (IQ modulated) sinusoid pulse uncorrelated to those of the other antennas. The reciprocal of the duration of each pulse is analogous to a "baud rate" and may be assumed to be constant, at least for the transmitting device 110B, to ease practical aspects concerning transceiver implementation.

In some embodiments, the transmitting device 110B may also utilize non-sinusoidal wavelets or may utilize a plurality of wavelets where each signal element utilizes a different wavelet for further scalability and security. The transmitting device 110B may transmit the pilot sequence 130 over $T_n \in \mathbb{N}$ baud intervals, and the pilot symbol modulating the sinusoid transmitted from the $m \in \mathbb{Z}^+_{\leq m_n}$ th antenna during the $t \in \mathbb{Z}^+_{\leq T_n}$ th baud interval is given in the mth row and tth column of the pilot matrix $X_n \in \mathbb{C}^{M_n \times T}$ and denoted by $X_n(m, t)$ in the following formula 3 wherein $\angle\ X_n(m, t) \sim \mathcal{U}(-\pi, \pi)$:

$$|X_n(m, t)| = \begin{cases} \sim \sqrt{\mathcal{U}(0, 1)}, & v_{n,m,t} \geq v_n \\ 0, & \text{o. w.} \end{cases} \qquad (3)$$

In the formula 3, $v_{n,m,t} \sim \mathcal{U}(0,1)$ is a random variable that determines whether the transmitting device's 110B mth antenna is activated during the tth baud interval and Un is the transmitting device's 110B activation threshold that determines the antenna activation probability; furthermore $f_p(v_{n,m_0,t_0},\ v_{n,m_1,t_1}) = f_p(v_{n,m_0,t_0})\ f_p(v_{n,m_1,t_1}) \forall m_0,\ m_1 \in \mathbb{Z}^+_{\leq M_n}$; $t_0,\ t_1 \in \mathbb{Z}^+_{\leq T_n}$. A zero entry in $X_n$ implies that no transmission occurs from that antenna during that baud interval. Therefore, $X_n$ describes the particular antenna activation sequence used by the transmitting device 110B in its columns, and the particular pilot sequence 130 transmitted by the transmitting device 110B and its elements. Together the variables $v_{n,m,t}$ and $v_n$ describe the activation sequence 140 for the transmitting device.

In some embodiments, the receiving device 110A is equipped with $N_s \in \mathbb{N}$ antennas that are formed in a non-modified 2D ULAA and have the default spatial signature 125 thereof. The difference in the unit spatial signature 125 in the transmit direction of $\Omega$ term denoted by $e_t(\Omega)$ may be replaced with the term $e_n(\Omega)$ derived in formula 2. The signal received at the receiving device's 110A $n < N_s$th antenna at the end of the $t < T_n$th baud interval is given on the nth row and tth column of $y_s \in \mathbb{C}^{N_s \times T_n}$ in the following formula 4:

$$y_s = H_n X_n + w \qquad (4)$$

In the formula 4, $w \in \mathbb{C}^{N_s \times T_n}$ is the additive white Gaussian noise (AWGN) matrix comprising independent elements identically distributed with $\sim \mathcal{CN}$ (0, $(\sigma_h/\gamma_n)^2$). $\gamma_n$ is the transmitting device's 110B SNR.

III. Detection Algorithm

Figure 5:
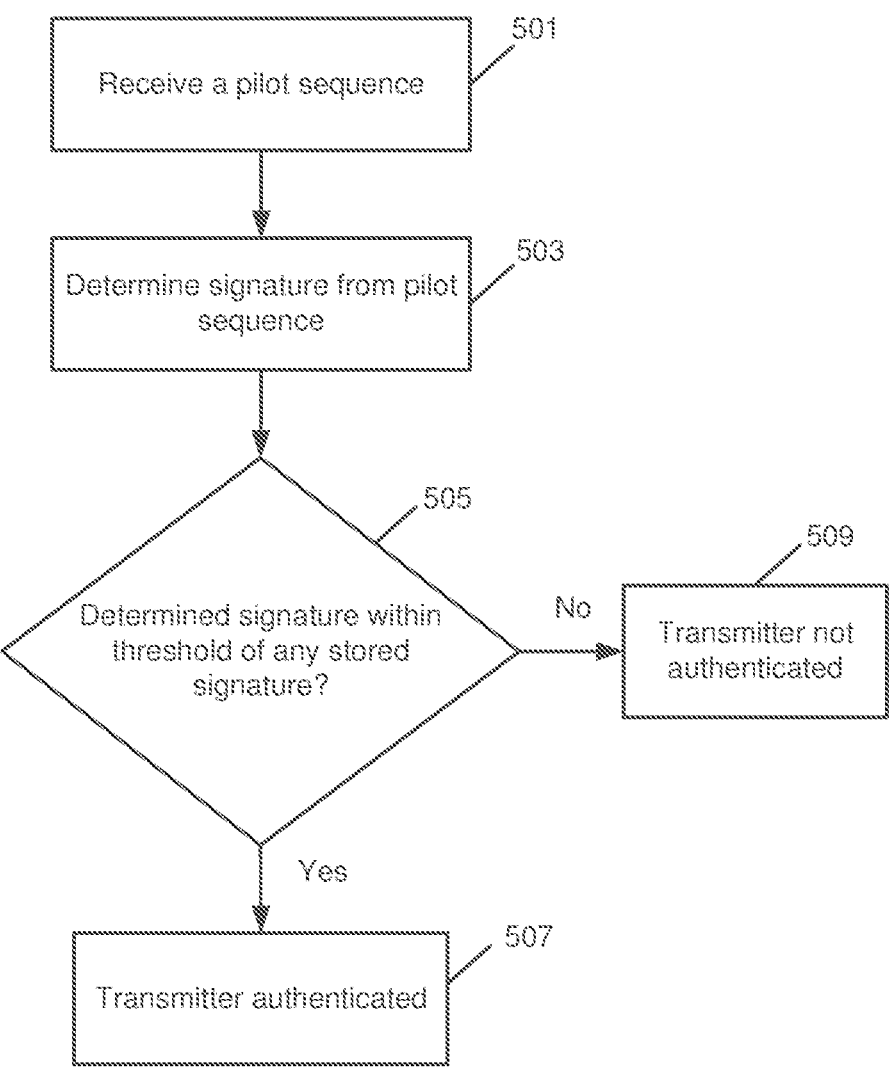
FIG. 5 is an illustration of an example method for transmitting device authentication using signatures.

Since the receiving device 110A relies on random deviations of spatial signatures 125, a detection algorithm for the transmitting device's 110B spatial signature deviation can be implemented to decide if the received signal is coming from the transmitting device 110B or not. This algorithm is illustrated in FIG. 5 as the method 500. The detection algorithm may be derived by correlating the transmitting device's 110B expected received signal over $y_s$. The correlation is calculated using the following formula 5:

$$\rho = tr\left(X_n^H H_n^H y_s\right) \qquad (5)$$

As the noise floor is sensitive to temperature and possible signal emission from imposters, the noise variance, $$\hat{\sigma}_n^2$$

$\in \mathbb{R}$, may be estimated by similarly correlating $y_s$ with any signature orthogonal to that of the transmitting device 110B and all other possible authorized users. The detection metric $\beta \in \mathbb{R}$ is then given by the following formula 6:

$$\beta = \frac{\rho}{\hat{\sigma}_n^2} \qquad (6)$$

The detection metric is then compared to a threshold value ($\psi$). To minimize the error, one threshold can be selected as half of the distance between two states according to the following formula 7:

$$\psi_e = \frac{tr\left(X_n^H H_n^H H_n X_n\right)}{2\hat{\sigma}_n^2} \qquad (7)$$

However, $\psi_e$ is not a good threshold for low SNR scenarios, which results in high false alarm (FA) rates. To prevent that, a threshold ($\psi_{FA}$) can be precalculated to fix the FA probability to a designated value. FA probability can be represented using the following formula 8:

$$Pr(FA) = Pr(\beta > \psi_{FA} \mid y_s) = w \qquad (8)$$

The formula 8 may be $\sim \mathcal{N}$ (0, tr($X_n{}^H H_n{}^H H_n X_n$)). The final threshold is found as the combination of both threshold as the following formula 9:

$$\psi = \max(\psi_e, \psi_{FA}) \qquad (9)$$

Performance analysis for a variety of false alarm thresholds is presented in Sec. IV.

IV. Performance Analysis

To evaluate the proposed authentication method, link level simulations have been performed under highly scattering Rayleigh channel. The receiving device 110A is assumed to have 512 antennas at all times, while the transmitting device 110B may have different number of active antennas depending on $v_n$.

Figure 3:
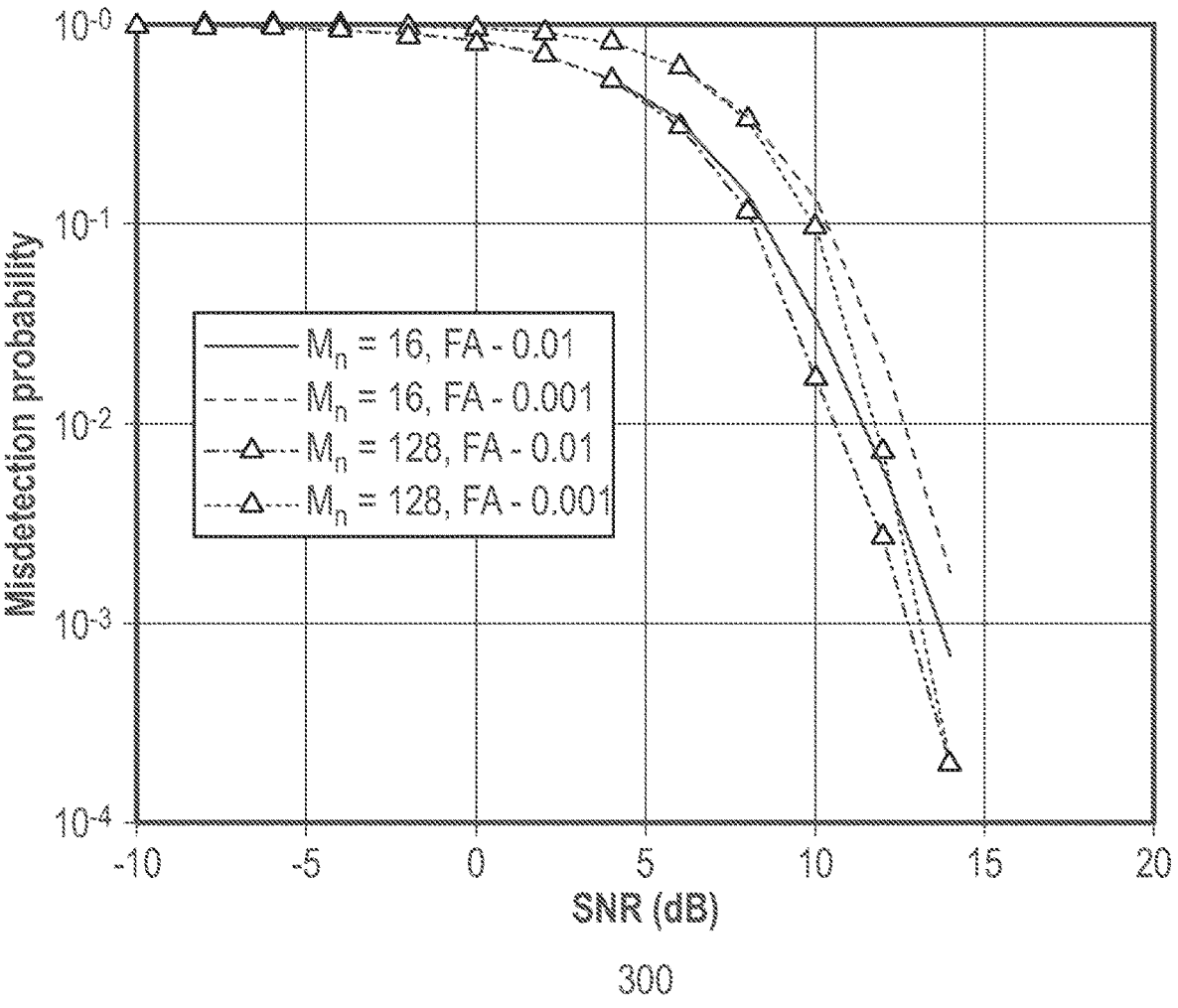
FIG. 3 is a graph illustrating missed detection rates.

FIG. 3 is an illustration of a graph 300 of the missed detection rate of a transmitting device's 110B signature against SNR. The proposed method fails to authenticate a transmitting device 110B with less than 1% probability at most at 13 dB SNR if $M_n=16$ antennas are activated while Pr(FA)=0.001. It is also seen that 1% misdetection probability can be achieved when 8 dB SNR for both $M_n=16$ and $M_n=128$ active antennas with relaxed FA requirement of Pr(FA)=0.01. Lower rates are possible as the number of active antennas is increased, or the false alarm probability requirement is relaxed.

Figure 4:
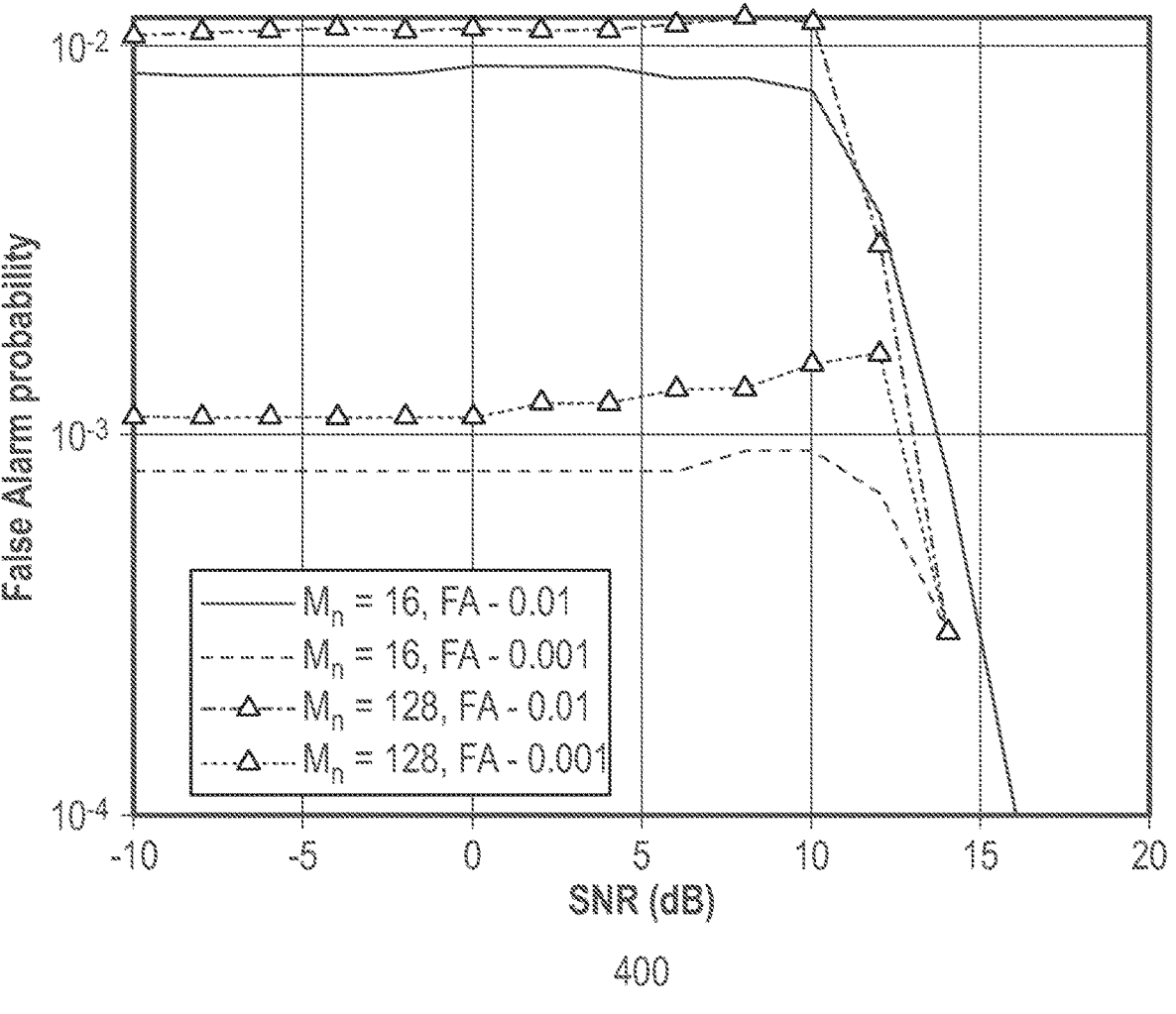
FIG. 4 is a graph illustrating false detection rates when receiving only noise for various $M_n$ and false alarm targets.

FIG. 4 illustrates a graph 400 of false detection rates of a transmitting device's 110B signature 125 when a receiving device 110A is only receiving noise. As it is seen from FIG. 4, the desired FA rates of Pr(FA)=0.001 and Pr(FA)=0.01 are closely achieved for SNR values up to 12 dB and 10 dB, respectively. After those SNR values the secondary threshold of $\psi_e$ becomes effective and improves the false alarm performance for a transmitting device's 110B signature 125 detection algorithm.

V. Example Embodiments

FIG. 5 is an illustration of a method 500 for authenticating a transmitting device 110B by a receiving device 110A. The method 500 may be implemented by one or more general purpose computing device such as the computing device 700 illustrated with respect to FIG. 7.

At 501, a receiving device receives a pilot sequence from a transmitting device. The pilot sequence 130 may be a sequence of transmitted frequencies that is agreed upon in advance by the receiving device 110A and the transmitting device 110B. The receiving device 110A and the transmitting device 110B may each include an array of antennas 120. The transmitting device 110B may include what is referred to herein as a chaotic antenna array 120B where one or more errors have been intentionally (or unintentionally) introduced to the array 120B. One example of such an error is changing the shape of one or more of the antennas. In particular, the shape of some or all of the antennas may be randomly adjusted. For example, FIG. 2 shows how the shapes of the typically square antennas may be randomly adjusted.

Another example of error is changing the amount of space between each antenna. Generally, antennas in arrays are spaced uniformly such there is the same amount of space between an antenna and neighboring antennas. Accordingly, to introduce error into the array, the distances between some or all of the antennas may be randomly adjusted.

Another example of error is changing the way antenna elements are fed. Each antenna may be associated with a feed line 160 that connects the antenna 120B to the transmuting device 110B. By randomly changing the lengths of the feed lines 160, additional error may be introduced into the array 120B.

In addition, in some implementations, during the transmission of the pilot sequence 130, the transmitting device 110B may selectively activate (or deactivate) various antenna elements. Depending on which antenna are active or inactive, additional error may be added to the pilot sequence 130. The selective activation or deactivation of antenna elements while sending the pilot sequence 130 is the activation sequence 140.

At 503, the receiving device may determine a signature for the transmitting device. Depending on the embodiment, the receiving device 110A may determine the signature 125 by comparing the received pilot sequence 130 with an expected pilot sequence. The difference between the received pilot sequence 130 and expected the expected sequence or signal is the signature 125 for the transmitting device 110B.

At 505, the receiving device may compare the determined signature for the transmitting device with a plurality of signatures of known signatures. Depending on the embodiment, the receiving device 110A may have been loaded or provided with one or more signatures 125 corresponding to transmitting devices 110B that the receiving device 110A is authorized to communicate with. For example, each authorized transmitting device 110B may have had different error introduced into its antenna array as described above. The pilot sequence 130 generated by each authorized transmitting device 110B is then captured, and a signature 125 is detected for each authorized transmitting device 110A. The signatures 110A of the authorized transmitting devices 110B may be stored in the receiving device 110A by an authorized user or administrator.

In some embodiments, the receiving device 110A may compare two signatures 125 by determining whether the signatures 125 are with a threshold of each other. If the signatures 125 are within the threshold, then they are likely associated with the same transmitting device 110B. The threshold may be selected by a user or administrator.

If the determined signature is within a threshold of a signature associated with a known or trusted transmitting device 110B, then the method 500 may continue at 507. Else, the method may continue at 509.

At 507, the receiving device may determine that the transmitting device is authenticated. Because the transmitting device 110B was associated with a known signature 125, the receiving device 110A may trust that the transmitting device 110B is authenticated. Because the the transmitting device 110B is authenticated the receiving device 110A may take one or more actions as communicating with the transmitting device 110A. In some embodiments, the transmitting device 110B have bee associated with a holding user or vehicle. In such embodiments, the actions may include opening a restricted door or gate and allowing the user or vehicle to enter. Other actions may be taken.

At 509, the transmitting device may take one or more more actions. Because the transmitting device 110B was not associated with a known signature 125, the receiving device 110A may not trust that the transmitting device 110B is authorized and may take one or more actions with respect to the transmitting device 110B. In some embodiments, the actions may include not communicating with the transmitting device 110B or not allowing the user or vehicle associated with the device 110B to enter a restricted location (e.g., a door or gate may remain locked.). The actions may include one or more cyber-physical actions such as actively jamming the transmitting device 110B or initiating an attack on the transmitting device 110B (e.g., launching missiles).

Figure 6:
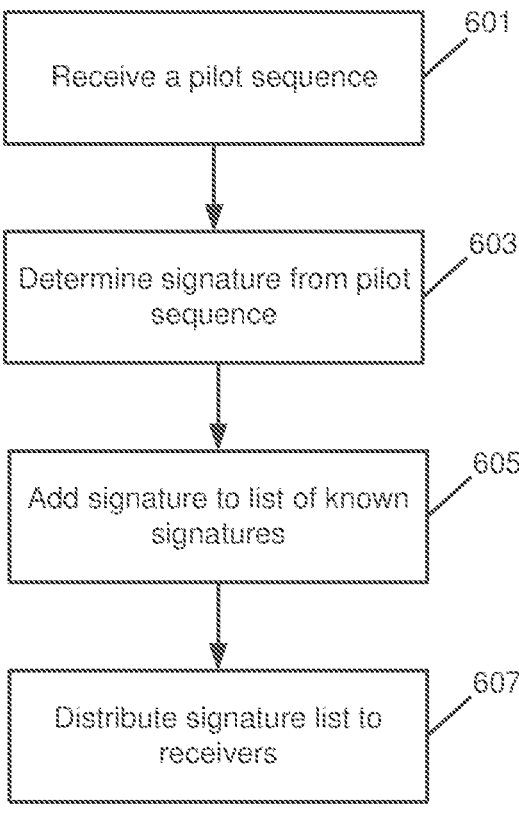
FIG. 6. Is an illustration of an example method for generating a list of transmitting device signatures to use for transmitting device authentication.

FIG. 6 is an illustration of a method 600 for generating a signature for a transmitting device. The method 600 may be implemented by one or more general purpose computing device such as the computing device 700 illustrated with respect to FIG. 7.

At 601, a receiving device receives a pilot sequence from a transmitting device. The receiving device 110A and the transmitting device 110B may each include an array of antennas 120. The transmitting device 110B may include a chaotic antenna array 120B where one or more errors have been intentionally (or unintentionally) introduced to the array. The errors may include shape errors and distance errors.

At 603, the receiving device may determine a signature for the transmitting device. Depending on the embodiment, the receiving device 110A may determine the signature 125 by comparing the received pilot sequence 130 with an expected pilot sequence. The difference between the received pilot sequence 130 and the expected signal is the signature 125 for the transmitting device 110B.

At 705, the signature is added to a list of known signatures. The list of known signatures 125 may correspond to transmitting devices 110B that a receiving device 110A is authorized to communicate with.

At 607, the list of signatures is distributed to a plurality of receiving devices. Each receiving device 110A may then use the list of signatures 125 to authenticate any transmitting device 110B that attempts to communicate with it.

Figure 7:
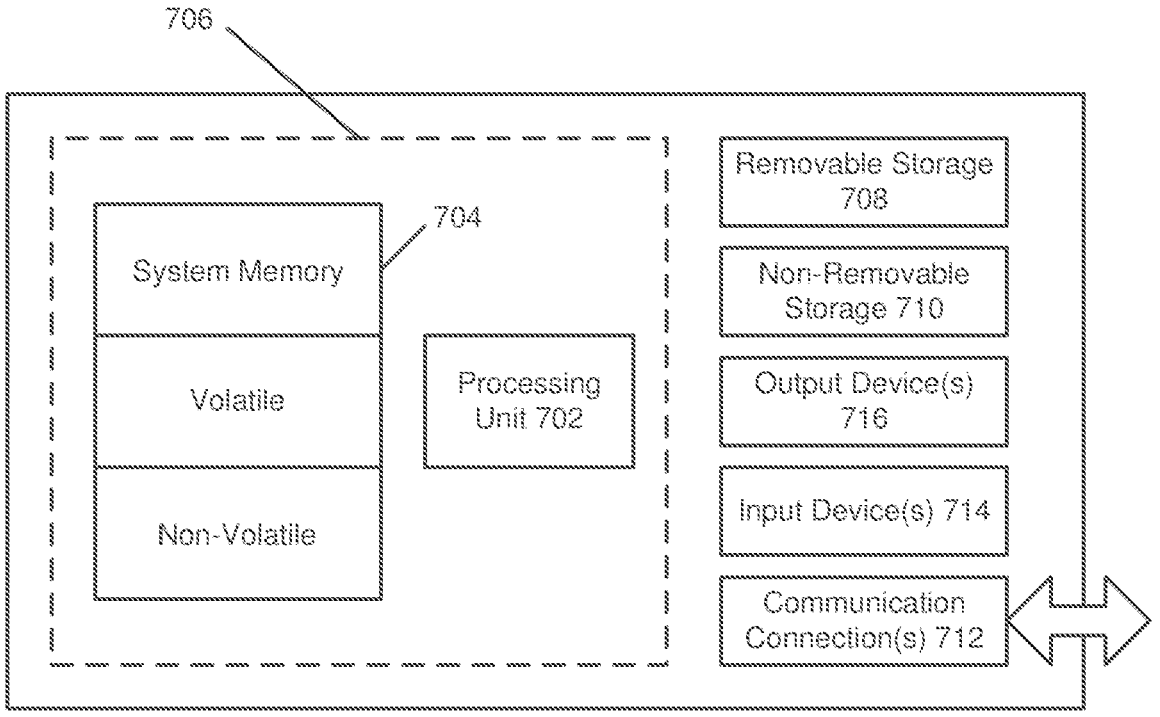
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for authenticating a transmitting device by a receiving device using signatures, the method comprising:
   receiving a signal by a receiving device from a transmitting device, wherein the transmitting device transmitted the signal from a chaotic antenna array associated with the transmitting device;
   determining a difference between a reference signal and the received signal by the receiving device;
   using the determined difference as a signature for the chaotic antenna array of the transmitting device by the receiving device;
   comparing the signature to a plurality of signatures by the receiving device, wherein each signature of the plurality of signatures is associated with known transmitting device;
   based on the comparison, determining whether the signature matches any signature of the plurality of signatures by the receiving device; and
   if it is determined that the signature matches any signature of the plurality of signatures, authenticating the transmitting device.

2. The method of claim 1, further comprising:
   if it is determined that the signature does not match any signature of the plurality of signatures, not authenticating the transmitting device.

3. The method of claim 2, further comprising, if it is determined that the signature does not match any signature of the plurality of signatures, taking one or more cyber-physical actions.

4. The method of claim 1, wherein the reference signal is a pilot sequence.

5. The method of claim 1, wherein the chaotic antenna array has one or more errors.

6. The method of claim 5, wherein the one or more errors are intentionally randomized errors.

7. The method of claim 5, wherein the chaotic antenna array includes a plurality of elements and the one or more errors comprise errors due to a displacement of the elements or errors due to a shape of each antenna element.

8. The method of claim 1, wherein determining whether the signature matches any signature of the plurality of signatures comprises determining whether the signature is within a threshold of any signature of the plurality of signatures.

9. The method of claim 1, further comprising receiving the plurality of signatures.

10. The method of claim 1, further comprising:
   introducing error into an antenna array of the transmitting device to create the chaotic antenna array;
   causing the transmitting device to transmit a signal to the receiving device using the chaotic antenna array;
   based on the received signal, generating the signature for the chaotic antenna array of the transmitting device;
   adding the generated signature to the plurality of signatures; and
   distributing the plurality of signatures to a plurality of receiving devices to use to authenticate transmitting devices.

11. A method for authenticating receiving devices comprising:
   introducing error into an antenna array of a transmitting device to create a chaotic antenna array of the transmitting device;
   causing the transmitting device to transmit a signal to a receiving device using the chaotic antenna array;
   determining a difference between a reference signal and the transmitted signal by the receiving device;
   using the determined difference as a signature for the chaotic antenna array of the transmitting device;
   adding the signature to a list of signatures, wherein each signature in the list of signatures is associated with a different transmitting device of a plurality of transmitting devices, wherein each transmitting device is associated with a different chaotic antenna array; and
   distributing the list of signatures to a plurality of receiving devices to use to authenticate transmitting devices.

12. The method of claim 11, wherein introducing error comprises introducing one or both of shape error or spacing error into the chaotic antenna array of the transmitting device.

13. The method of claim 11, wherein causing the transmitting device to transmit the signal to a receiving device comprises causing the transmitting device to transmit a pilot sequence that varies with time.

14. The method of claim 13, wherein the pilot sequence comprises one or more of non-sinusoidal wavelets, or a mixture of wavelets.

15. The method of claim 13, wherein transmitting the pilot sequence that varies with time comprises one or more of selectively activating and deactivating antenna elements of the chaotic antenna array while transmitting the pilot sequence, or varying a feed length with time.

16. A receiving device comprising:
   an antenna;
   a storage comprising a plurality of signatures, wherein each signature is associated with a trusted transmitting device of a plurality of trusted transmitting devices; and
   at least one processor that:
      receives a signal from a chaotic antenna array of a transmitting device;
      determines a difference between a reference signal and the received signal;
      uses the determined difference as a signature for the chaotic antenna array of the transmitting device;
      compares the signature to the plurality of signatures;
      based on the comparison, determines whether the signature matches any signature of the plurality of signatures; and
   if it is determined that the signature matches any signature of the plurality of signatures, authenticate the transmitting device as a trusted transmitting device.

17. The system of claim 16, wherein the receiving device further:

if it is determined that the signature does not match any signature of the plurality of signatures, taking one or more cyber-physical actions.

18. The system of claim 16, wherein the chaotic antenna array has one or more intentionally randomized errors.

\* \* \* \* \*